June 24, 1924.

F. R. McGEE

FLEXIBLE COUPLING

Filed Aug. 23, 1922

Witnesses:
Edwin Trueb

Inventor:
FRANK R. McGEE,
by D. Anthony Usina
his Attorney.

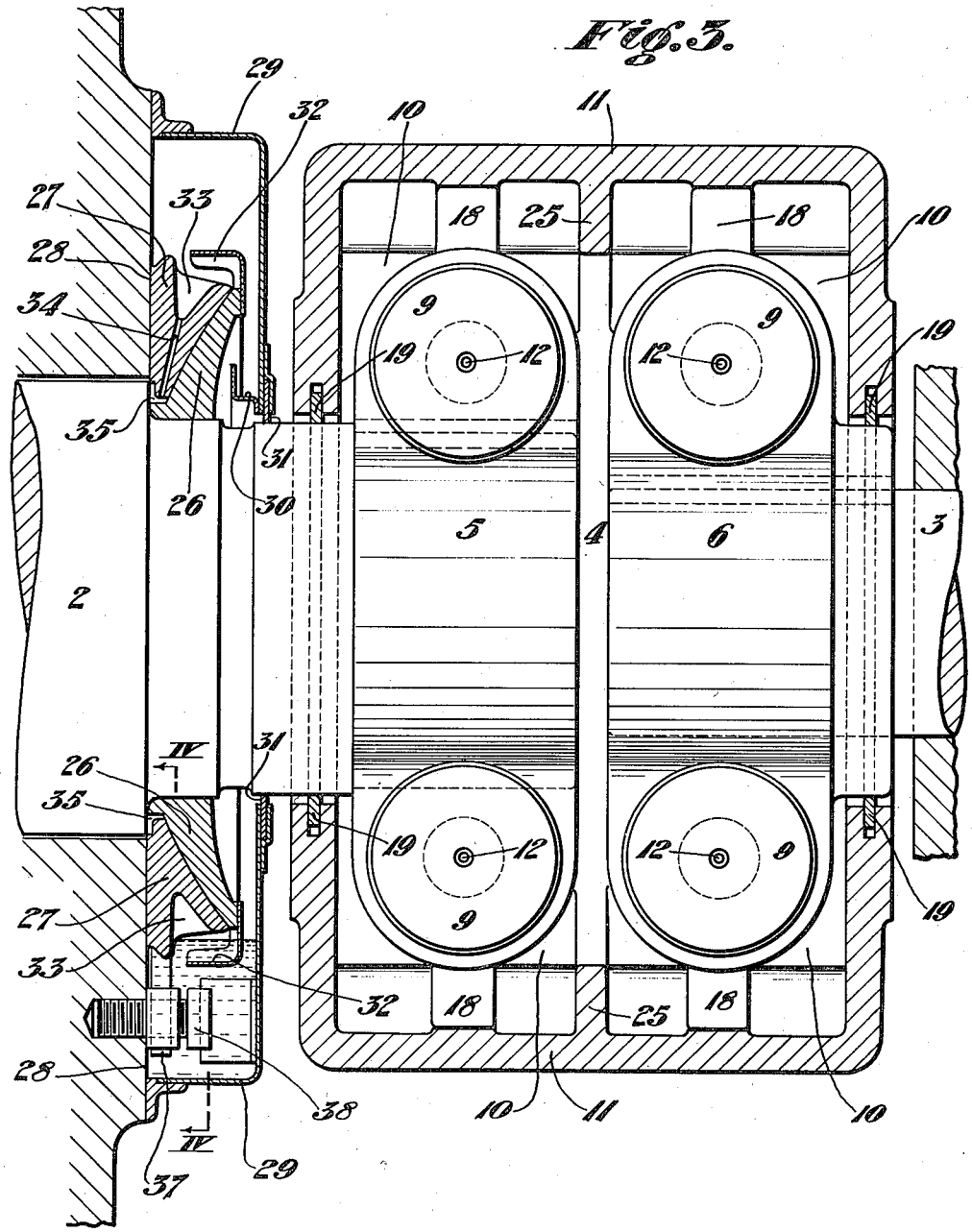

June 24, 1924.

F. R. McGEE 1,498,801

FLEXIBLE COUPLING

Filed Aug. 23, 1922

Witnesses:
Edwin Trueb

Inventor:
FRANK R. McGEE,
by:
D. Anthony Usina
his Attorney

Patented June 24, 1924.

1,498,801

UNITED STATES PATENT OFFICE.

FRANK R. McGEE, OF STEUBENVILLE, OHIO.

FLEXIBLE COUPLING.

Application filed August 23, 1922. Serial No. 583,804.

*To all whom it may concern:*

Be it known that I, FRANK R. McGEE, a citizen of the United States, and resident of Steubenville, in the county of Jefferson and State of Ohio, have invented certain new and useful Improvements in Flexible Couplings, of which the following is a specification.

This invention relates to flexible couplings used to connect the contiguous ends of rotary shafts or spindles, and has for one of its objects the provision of a coupling of this class that will be more compact than those heretofore devised.

Another object is to provide a coupling having a driving box or shell, which is split on a line parallel to the longitudinal axis of the coupled shafts forming two parts, thereby facilitating assembling and dismantling in locations where the end travel is limited.

A further object is to provide a coupling of this class having means for preventing the chattering of its parts when starting or reversing the rotation of the shafts.

A still further object is to provide a coupling having the novel construction, design, and combination of parts described in the following specification, and illustrated in the accompanying drawings.

In the drawings—

Figure 3 is a sectional side elevation showing a thrust collar or bearing in combination with the coupling, the driving box or casing of the coupling being sectioned along its center line.

Figure 1:
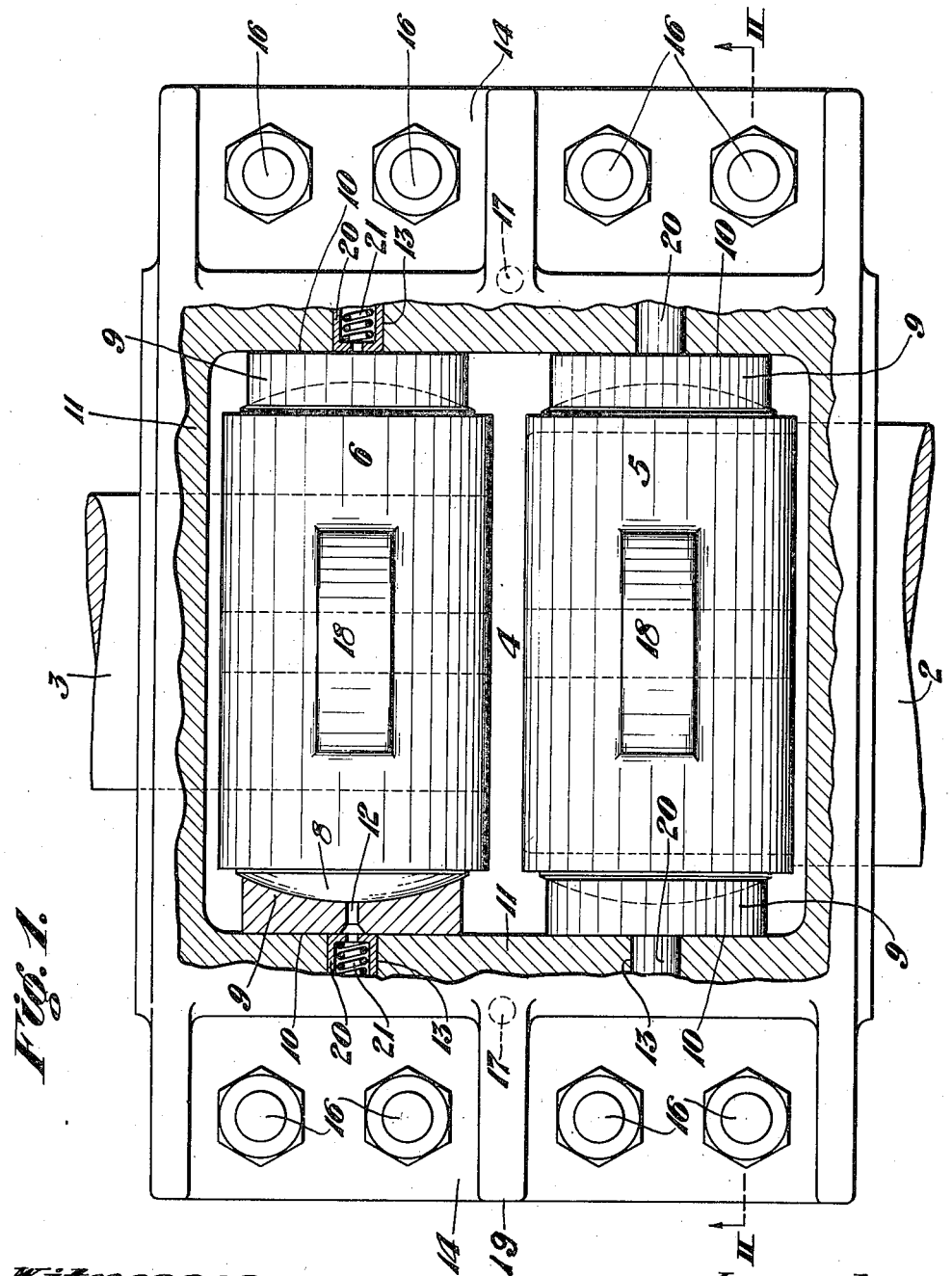
Figure 1 is a top plan view of a coupling constructed according to this invention, the casing or driving box being broken away to show the cross heads.
Figure 2:
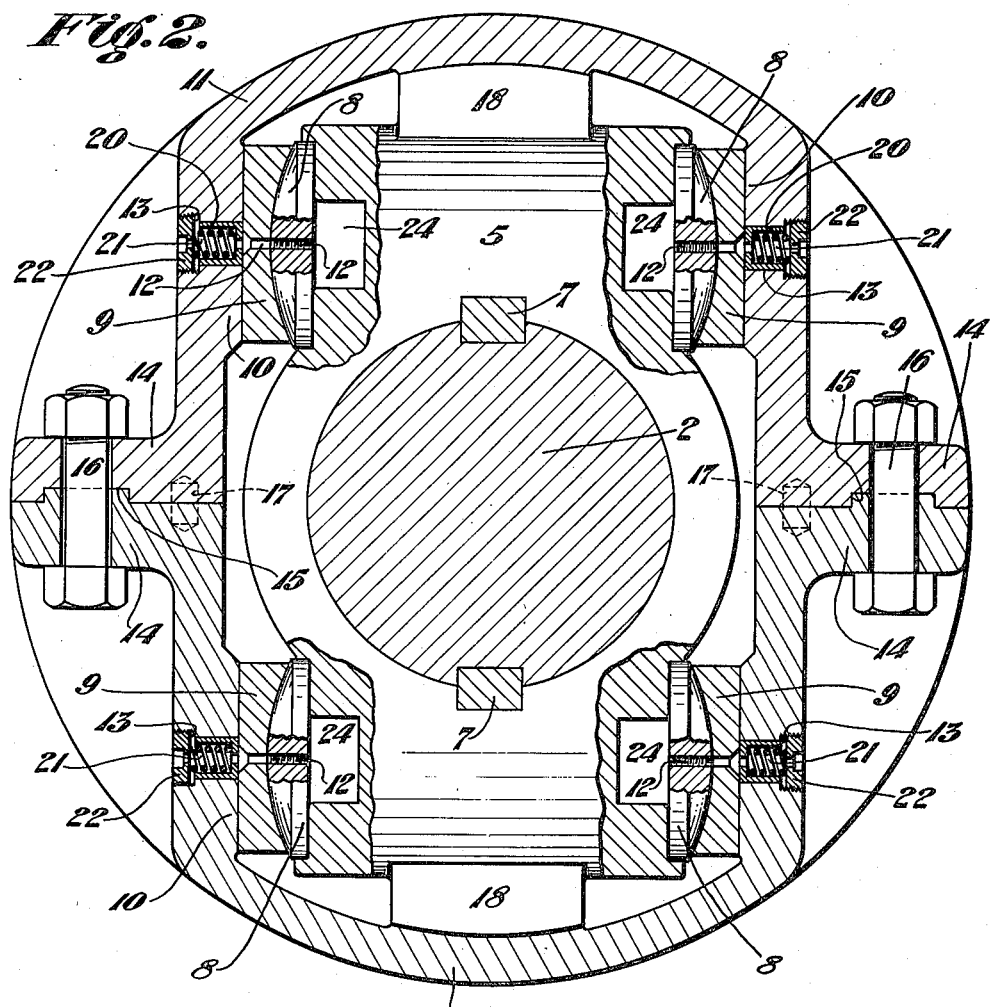
Figure 2 is a cross sectional elevation on the line II—II of Figure 1.

Referring more particularly to the drawings, the numerals 2 and 3 designate the coupled shafts, one being the driven and the other the driving shaft. Mounted on the adjacent ends of the shafts 2 and 3 which are spaced apart to form a space 4 for operating clearance, are cross heads 5 and 6, respectively. The cross heads 5 and 6 are keyed to the shafts by keys 7 and are provided with recesses in their side faces for the reception of hardened steel washers 8. The washers 8 are provided with one flat face and one convex face, the flat faces fitting snugly within the recesses in the cross heads and the convex faces accurately fitting within the inner concave faces of cooperating washers 9, whose outside faces are flat and bear against machined bearing portions 10 of an enclosing driving box 11 which surrounds the cross heads 5 and 6.

To facilitate assembling in the driving box, the washers 8 and 9 are drilled and tapped as at 12 for the reception of a screw (not shown), so that the washers may be held in position during the assembling operation. When the parts are assembled, the screws are removed from the apertures 12 through the spring plunger apertures 13 formed in the driving box.

The driving box 11 is split on a line parallel with the longitudinal axis of the shafts forming a two-part box. Each part of the box 11 is provided with outwardly extending attaching flanges 14, which are machined to form a tongue and groove joint 15, thus removing all shearing and twisting stresses from the flange attaching bolts 16. Dowel pins 17 are provided in the flanges 14 to assure accurate centering and alinement of the box parts when assembling.

The driving box 11 is supported in position by lugs 18 on the cross heads 5 and 6, the inner face of the box 11 at the point of contact with the lugs 18 being machined or babbitted for a working fit with the lugs 18. The outer ends of the box 11 is provided with sealing rings 19 adapted to contact with the respective shafts 2 and 3 to prevent the escape of oil or grease from the box and to prevent dust entering the box.

After the coupling has been assembled and the box bolted in position, the assembly screws will be removed from the washers 8 and 9 through the plunger apertures 13, and spring plungers 20 supported by springs 21 will be inserted in the apertures 13 and bear against the washers 9. The plungers 20 and springs 21 are held in position and the springs under compression by oil or grease plugs 22, which are threaded into the apertures 13 and bear against the springs 21. The plungers 20 and springs 21 serve to force the washers 8 and 9 into close and true bearing contact and to thereby prevent chattering upon starting or reversing the rotation of the shafts.

The recess or chamber formed between the plungers 20 and plugs 22, together with the drilled apertures 12 from which the assembly screws have been removed, and the reserve pockets 24, form a lubrication system for the coupling, they either being filled with grease, or a wick (not shown), may be inserted into the aperture 12 and coiled within the spring 21 for a wick oiling system.

The driving box 11 is stiffened by internal stiffening ribs 25.

Figure 4:
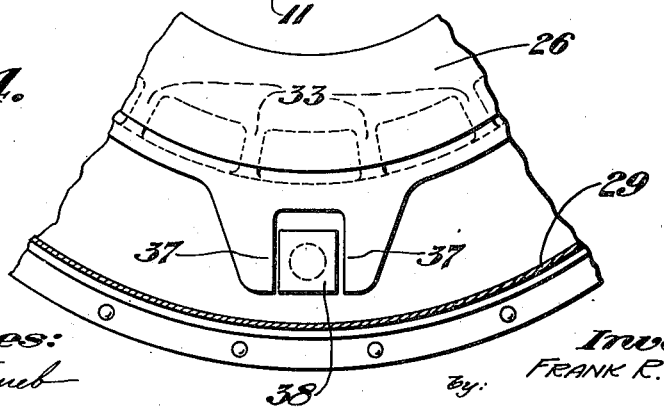
Figure 4 is an enlarged fragmentary detail on the line IV—IV of Figure 3.

For conditions where end thrust is encountered, a balled or spherical thrust collar 26 may be used, (see Figures 3 and 4,) this collar may be an integral part of the cross head 5 or may be separate, as desired. Thrust from the collar 26 is taken up by the stationary thrust pressure equalizing washer 27, which in turn bears against the shaft journal bearing 28. The thrust bearing is enclosed in an oil and dust guard 29 carrying an oil collecting trough 30 and an oil retaining seal 31. Oil throwing or splashing projections 32 are secured to the thrust collar 26 and these with stiffening webs 33, and oil circulation grooves 34 and oil reservoir space 35 provide a thorough oil distribution and lubrication system for the bearing. Thrust pressure equalizing washers 27 are prevented from rotation by thrust washer lugs 37 and stop 38, but is free to seek its own center due to the clearance between lugs 37 and stop 38 and clearance at the oil reservoir space 35.

Figure 5:
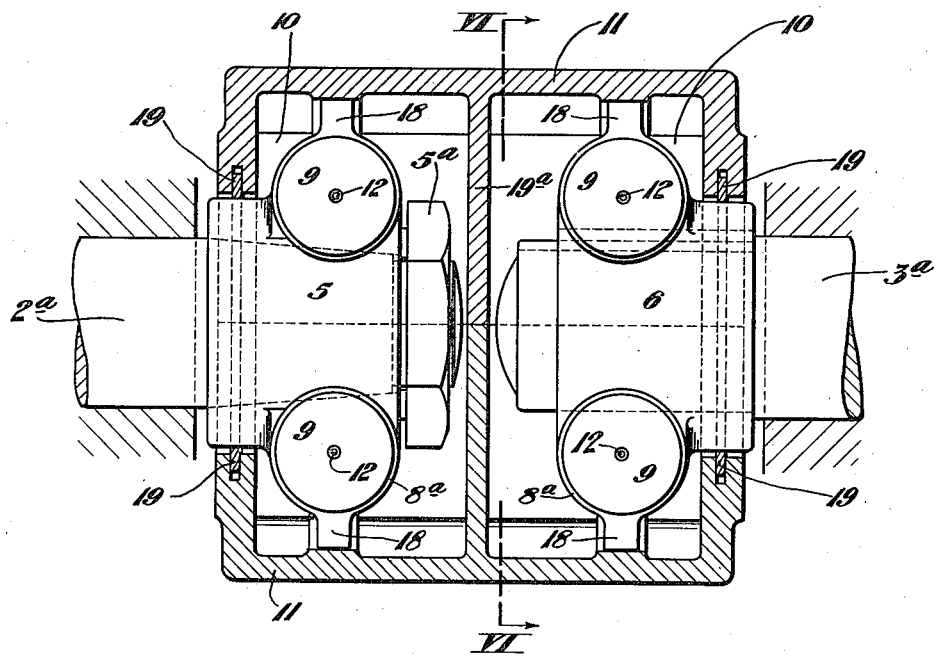
Figure 5 is a vertical sectional elevation of a modified form of coupling.
Figure 6:
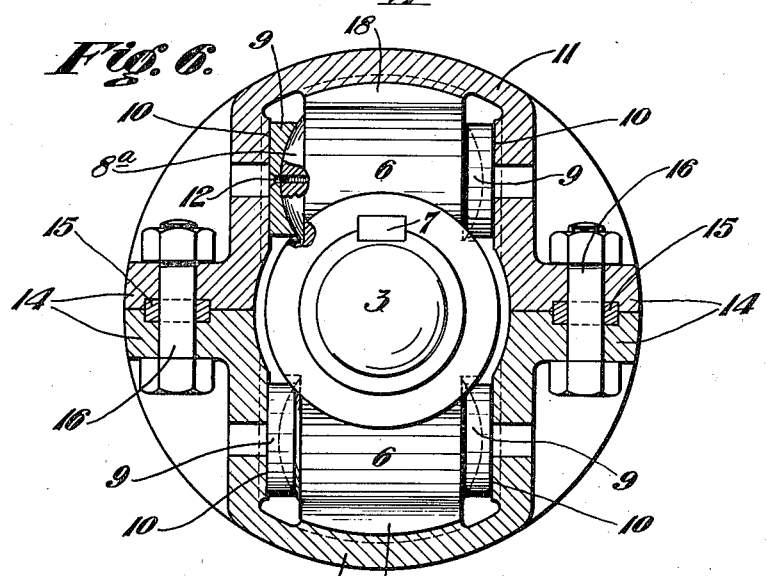
Figure 6 is a cross sectional view on the line VI—VI of Figure 5.

In Figures 5 and 6 a modified form of coupling is shown which is particularly designed for coupling tapered end motor shafts. The coupling of Figures 5 and 6 is similar in construction to the coupling heretofore described, with the exception that the cross head 5 has a tapered bore to fit the tapered motor shaft $2^a$ which has a nut $5^a$ threaded thereon to hold the cross head in position, and the end faces of the cross heads 5 and 6 are provided with convex projections $8^a$ instead of being recessed to receive convexly faced washers. The projections $8^a$ taking the place of the washers 8 and cooperating with the concave washers 9 to provide for the universal movement between the shafts. Also instead of the plurality of reinforcing ribs 19 as shown in the construction of Figures 1 to 4, a continuous reinforcing rib is formed around the casing 11 and extend inwardly between the shafts 5 and 6 so that it may abut against said shafts and limit the end travel of the casing.

The operation of my improved apparatus will be readily understood, the washers 8 or projections $8^a$ and washers 9 will cooperate to provide a limited universal movement between the shafts. The apparatus is simple and will not require frequent repairs. The mechanism of the coupling is provided outside of the shaft diameter instead of between the shaft ends, thereby eliminating the necessity of spacing the shaft ends a distance sufficient to receive said mechanism as is the common practice. The driving casing is split on a line parallel with the longitudinal axis of the shafts, thus facilitating the assembling and dismantling of the coupling in locations where end travel is limited.

I claim—

1. The combination with two shafts arranged in substantial alinement and having their abutting ends in close proximity to each other, of means for coupling said shafts together, said means comprising a cross head keyed to each of said shafts adjacent their abutting ends, a two piece driving box completely surrounding said cross heads to thereby prevent the escape of oil and grease and exclude all dust from the interior of said coupling, said box being split on a line parallel with the longitudinal axis of said shafts, and co-operating concave and convex faced washers mounted between said box and said cross heads to form a driving connection therewith, said washers permitting a limited universal movement of said shafts and cross heads relative to said box.

2. The combination with two shafts arranged in substantial alinement and having their abutting ends in close proximity to each other, of means for flexibly coupling said shafts to each other, said means comprising a cross head secured to each of said shafts adjacent their abutting ends, a driving box mounted around said cross heads, and cooperating concave and convex faced washers mounted between said box and said cross heads to form a driving connection therewith, said washers permitting a limited universal movement of said shafts and cross heads relative to said box, and spring members under tension adapted to normally bear against said washers to force them against said cross heads and hold them in their true positions, thereby preventing chattering when starting or reversing the shafts, substantially as described.

3. The combination with two shafts arranged in substantial alinement and having their abutting ends in close proximity to each other, of means for flexibly coupling said shafts to each other, said means comprising a cross head secured to each of said shafts adjacent their abutting ends, a two piece driving box mounted around said cross heads, and co-operating concave and convex faced washers mounted between said box and said cross heads to form a driving connection therewith, said washers permitting a limited universal movement of said shafts and cross heads relative to said box, and means adapted to normally force said washers against said cross heads and hold them in their true positions, thereby preventing chattering when starting or reversing the shafts, substantially as described.

In testimony whereof I have hereunto set my hand.

FRANK R. McGEE.